May 4, 1948.  R. C. WEBB  2,440,992
SQUARE WAVE GENERATOR
Filed May 18, 1945
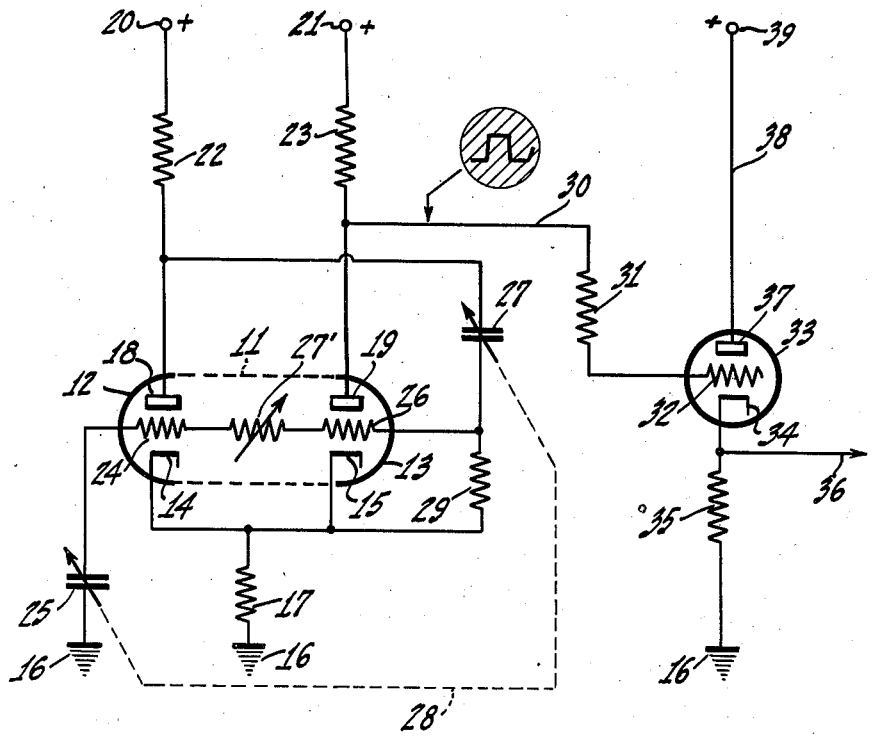
INVENTOR.
RICHARD C. WEBB
BY
Samuel B. Smith.
ATTORNEY Patented May 4, 1948

2,440,992

UNITED STATES PATENT OFFICE 2,440,992

SQUARE WAVE GENERATOR

Richard C. Webb, La Fayette, Ind., assignor to Purdue Research Foundation, West Lafayette, Ind., a corporation of Indiana Application May 18, 1945, Serial No. 594,404

8 Claims. (Cl. 250—36)

This invention relates to electronic apparatus particularly designed for the purpose of developing wave image or test signals usable particularly in testing wide band amplifiers, such as those used for television and oscillograph operations, for instance, or usable as a switching or triggering device.

Various forms of square wave signal generators have heretofore been adopted. Generally speaking, these units of the prior art are arranged to develop electrical wave forms which will serve to test the response of an amplifier at the very low frequency end of the pass-band as well as at the high frequency end. In such operations, it has been found that for low frequency testing the period of the square wave must be comparable to the time constant of the coupling circuits under test in order that the tilt of the resultant output wave may be judged and interpreted in terms of sine wave phase-frequency and amplitude-frequency response.

Tests which occur at the high frequency end of the spectrum are based upon the rate of raise of the output wave front. Hence, it is often necessary to expand the time base of the oscillograph to permit examination of phenomena which persist only a few microseconds, depending upon the bandwidth of the amplifier or the television circuit under test.

Wave form generators of the type heretofore used in the art have been capable of developing reasonably good shaped square waves but the prior art apparatus, as far as is known to applicant, did not have freedom of adjustment to such an extent that the width of the square wave pulses could readily be varied or adjusted while maintaining a generally known and accurate shaping. Still further, the prior art apparatus did not, so far as is known, provide for a changing of the repetition rate at which the pulses are repeated by a simple variation or adjustment of the circuit.

The apparatus herein to be set forth, broadly speaking, comprises a switching circuit which makes use of the so-called twin type tube, such as the triode known, for instance, as the types 6F8-G or 6SN7, which has its separate portions connected to form a trigger circuit. In this general arrangement, the switching rate between the operation of the connected halves of the twin tube, or of the separate tubes where two separate tube instrumentalities are used to replace a twin type tube, is effected by means of two simultaneously acting condenser units operating in conjunction with a resistor which connects the control electrode of the separate tubes together. Broadly speaking, the two tubes have their cathodes connected to ground or to a source of fixed potential by way of a suitable cathode resistor. The plates or anodes of the tubes are supplied with plate voltage through suitable plate load resistors. The grid or control electrode of the first tube is connected to ground through one of the capacity units and also connects to the grid or control electrode of the other tube section through the resistor element above mentioned. This second control electrode then connects to the plate of the first triode half through a second condenser, which functions in unison with the first condenser. Output signals from the system are derived from the plate of the second triode half across its plate resistor.

From what is to follow, it will be seen that an adjustment of the resistor or capacity units will serve to vary with the repetition rate or the width of the pulses, respectively.

Insofar as the present invention is concerned, it has as one of its primary objects that of providing a square wave generator unit in which accurately shaped waves of known width and repetition frequency are obtainable. The invention also has as one of its objects that of providing a simple and conveniently operable means to vary either or both the wave repetition frequency and the pulse width. A further object of the invention is that of providing a square wave generator circuit which is efficient in its operation, simple in its arrangement and construction, easy to set up and operate, and which, at the same time, is inexpensive and yet overcomes one or more difficulties heretofore found to exist in the prior art. Other objects and advantages of the invention will readily suggest themselves to those skilled in the art to which the invention is directed when the following specifications are considered particularly in conjunction with the single figure of drawing forming a part of this disclosure.

If reference is now made to the drawing, it will be seen that the switching circuit which is embodied in the illustrated example includes a twin type triode tube 11 formed, for illustrative purposes, into a first tube section 12 and a second tube section 13. As above indicated, a tube of this type may be one known as the types 6F8-G or 6SN7, although various other forms of tubes may be substituted and, where desired, completely separate tube envelopes for the first and second sections 12 and 13 may be utilized provided the separate tube elements have like or substantially like operating characteristics and parameters. In any event, the effect is that of two separate current paths established between the respectively associated anode and cathode elements of the tubes or separate tube sections.

The cathode elements 14 and 15 of the two tube sections connect to each other and then to ground 16 by way of a cathode resistor 17. The plate or anode elements 18 and 19 connect to terminal points 20 and 21, respectively, through plate resistors 22 and 23, respectively. A source of voltage (not shown) has its positive terminal connected to the terminal points 20 and 21 and its negative terminal connected to ground 16, for instance. With the illustrated type of tube, a positive potential of approximately 250 volts relative to ground is applied at the terminals 20 and 21.

The control electrode 24 of the first tube section 12 is connected to ground 16 by way of the adjustable capacitor 25. The same control electrode is connected to the control electrode 26 of the second tube section 13 by way of the resistor 27'. The plate electrode 18 of the first tube section 12 is connected to the grid or control electrode 26 of the second half of the tube by way of the adjustable capacitor 27. The capacitors 25 and 27 are arranged for uni-control operation by the conventionally indicated connection 28. The grid return resistor 29 is arranged to connect the grid 26 to the upper end of the cathode resistor 17.

Output voltages are derived from the plate or anode 19 from the second half section of the tube by way of a conductor 30 which supplies the output voltage through a resistor 31 to the input or control electrode 32 of an output tube 33. The tube 33 is preferably arranged as a cathode follower. In this form of operation the cathode element 34 is connected to ground 16 through the cathode output resistor 35, and output signal voltages are derived from the output conductor 36. Operating voltages for the tube 33 are applied to its plate or anode 37 by way of a conductor 38 connected to a terminal point 39, where operating voltages of approximately the same potential relative to ground as those applied at the terminals 20 and 21 are available.

For convenience of illustration and for diagrammatic representation only an assumed wave form of the output voltage in conductor 30 is diagrammed immediately above that conductor.

In the arrangement hereinabove described, it will be seen that the condensers 25 and 27 operating in conjunction with the resistor 27' serve as the basic elements to control the switching rate between the tube sections 12 and 13. The resistor 29 serves as a return for the grid and, in the operation of the circuit herein to be described, may be disregarded, generally speaking. The cathode resistor 17 is not critical, nor are either of the plate resistors 22 or 23.

For the purpose of illustrating the operation of the circuit hereinabove set forth, it may be assumed that plate voltage has just been applied to each section of the tube 11. Under these circumstances, the condenser 25 has not had time to become charged so that the grid 24 may be for the moment considered as tied to ground. At the same time, the condenser 27 is also as yet uncharged, with the result that the voltage of the power supply is instantaneously supplied across the resistors 22 and 27'. This makes it appear that the grid 26 will be held at a potential which is considerably positive relative to the grid 24 and consequently the plate current of the right-hand tube section 13 will necessarily be very large. Consequently, at the assumed time the potential of the plate 19 is reduced to its minimum value.

It thus will become apparent that the left-hand tube section 12 will have considerable negative bias voltage applied to it at the assumed time due to the plate current of the right-hand tube section 13 flowing through the common cathode resistor 17. This results in biasing the left-hand tube section to a cut-off state and thus arresting the plate current flow through this tube portion.

After a predetermined length of time which will be measured by the time constant of the condensers 25 and 27 taken along with the resistors 22 and 27' the potential of the left-hand tube section grid 24 becomes more positive while that of the right-hand tube section grid 26 becomes less positive. At some critical point, the negative bias applied to the left-hand tube section 12 is overcome and this portion of the tube 11 commences rapidly to draw plate current.

As soon as plate current flows in the left-hand tube section 12 the potential of its plate 18 is lowerer and likewise the potential effective at the grid 26 of the right-hand tube 13 is reduced because for the moment a large charge is still present on condenser 27. However, with the right-hand grid 26 forced highly negative with respect to the cathode, the plate current flow in the right-hand tube section 13 is cut-off and the potential effective on the plate 19 rises to its maximum value.

At this time the charges which have been held on the condensers 25 and 27 now adjust themselves to the new conditions which are brought about by the flow of plate current in the left-hand tube section 12. This causes the left-hand grid 24 to fall in potential and the right-hand grid 26 is gaining sufficiently positive potential to enable the right-hand tube to seize control of the current flow.

It thus will be appreciated that the system serves to recycle itself in such a way that the plate current of each tube sections 12 and 13 is alternately on or off. The symmetry of the resulting square wave, such as that shown above the conductor 30, may be altered by adjusting the ratio between the condensers 25 and 27. The wave halves are practically symmetrical when the ratio is unity and the maximum and minimum amplitude portions of the developed waves are then of practically equal duration. It will be apparent that if the condensers 25 and 27 are connected by a suitable connector switch it will be possible to switch from one ratio of condenser to another merely by moving the switch to various positions. Other adjustments may be effected by a variance of the condensers through means of the control 28, conventionally represented. Thus, the periods of maximum and minimum amplitude of the square waves may be adjusted relative to each other by varying the relative size of condensers 25 and 27.

The frequency at which the switching operations are brought about is determined largely by the value of the resistor 27 and an adjustment of this resistor will bring about a change in the repetition rate.

It will be evident that the rise and fall of potential of the plate of the tube section 13 can readily be effected by the amount of unwanted capacity connected in shunt to it. Therefore, the output of the tube section as it appears in conductor 30 is fed through the resistor 31 to the cathode follower stage 33. An output voltage is derived in the conductor 36, as above indicated.

In the event that the circuit hereinabove described is used for testing television and other transient amplifiers and some forms of oscillograph apparatus, it is usually desirable to have the test signal provided with sharper leading edges than can be obtained directly from a switching oscillator. Accordingly, the output from conductor 36 is frequently fed to a pulse sharpening circuit of known type which serves to sharpen or square up the wave formations in known manner.

Having now described my invention, what I claim is:

1. A wave generator comprising a pair of thermionic tubes each including an anode, a cathode and a control electrode, means for supplying operating voltages between the anode and cathode elements of each respective tube, a common resistance element connecting each of the cathode elements of each tube and a predetermined point of fixed potential, a capacity element connecting the anode element of the first tube to the control electrode of the second tube, a second capacity element connecting the control electrode of the first tube to the said point of fixed potential, a resistance element connected between each of the control electrodes, a load resistance connected to each of the anode elements, and an output terminal connection whereat output voltages of substantially square wave form are derived in accordance with the current which is caused alternately to flow between the anode and cathode of each tube due to the alternating conducting and non-conducting operation thereof when the said operating voltages are applied.

2. A wave generator comprising thermionic apparatus including means comprising separate pairs of anode, cathode and control electrodes between which two separately controlled electron flows are developed with application of operating potentials impressed between the separate and respective anode and cathode elements, a common connection between each cathode element and a point of fixed potential including a resistance element, a connection from the anode element included in the first electron flow path to the control electrode included in the second electron flow path, said connection including a capacity element, a capacity connection between the control electrode included in the first electron flow path and the point of fixed potential, a resistance means for connecting each of the control electrodes together, a load resistance connected to each of the anode elements, a load circuit connection to which output voltages are supplied in accordance with the current flow in the separate electron paths, and a pair of terminal means whereat operating voltages are applied through the last-named resistances to the said respective anode elements whereby current is caused alternately to flow between the anode and cathode of each electron path and to provide thereby substantially square wave output voltages.

3. A wave generator comprising thermionic apparatus including means comprising separate pairs of anode, cathode and control electrodes between each of which separately controlled currents are developed with application of operating potentials impressed between the anode and cathode elements, a galvanic connection between each cathode element, a resistance element connected between the cathodes and a point of fixed potential, a connection from the anode element included in the first current path to the control electrode included in the other current path, said connection including a capacity element, a connection between the control electrode included in the first current path and said point of fixed potential, said connection also including a capacity element, a resistance element connected between each of the control electrodes, a load resistance connected to each of the anode elements, terminal means whereat operating voltages are applied through the last-named resistances to the said anode elements, whereby with application of operating potentials a current is first caused to flow between the anode and cathode of the second current path and interruption of current occurs in the first electron path after which the operation is reversed and continues to alternate during the period of application of operating potentials to provide thereby substantially square wave output voltages.

4. A wave generator comprising thermionic apparatus including means comprising separate pairs of anode, cathode and control electrodes between each of which separately controlled currents are developed with application of operating potentials impressed between the anode and cathode elements, a galvanic connection between each cathode element, a resistance element connected between the cathodes and a point of fixed potential, a connection from the anode element included in the first current path to the control electrode included in the other current path, said connection including a capacity element, a connection between the control electrode included in the first current path and said point of fixed potential, said connection also including a capacity element, a resistance element connected between each of the control electrodes, a load resistance connected to each of the anode elements, terminal means whereat operating voltages are applied through the last-named resistances to the said anode elements, whereby with application of operating potentials a current is first caused to flow between the anode and cathode of the second current path and interruption of current occurs in the first electron path after which the operation is reversed and continues to alternate during the period of application of operating potentials to provide thereby substantially square wave output voltages, and means for simultaneously varying the said capacity elements to vary the relative duration of the maximum and minimum amplitude portions of the developed square waves in accordance with the size of the said capacities relative to each other.

5. A wave generator comprising thermionic apparatus including means comprising separate pairs of anode, cathode and control electrodes between each of which separately controlled currents are developed with application of operating potentials impressed between the anode and cathode elements, a galvanic connection between each cathode element, a resistance element connected between the cathodes and a point of fixed potential, a connection from the anode element included in the first current path to the control electrode included in the other current path, said connection including a capacity element, a connection between the control electrode included in the first current path and said point of fixed potential, said connection also including a capacity element, a resistance element connected between each of the control electrodes, a load resistance connected to each of the anode elements, terminal means whereat operating voltages are applied through the last-named resistances to the said anode elements, whereby with application of operating potentials a current is first caused to flow between the anode and cathode of the second current path and interruption of current occurs in the first electron path after which the operation is reversed and continues to alternate during the period of application of operating potentials to provide thereby substantially square wave output voltages, and means to establish equality between the said capacity elements so as to establish symmetrical output square waves.

6. A wave generator comprising thermionic apparatus including means comprising separate pairs of anode, cathode and control electrodes between each of which separately controlled currents are developed with application of operating potentials impressed between the anode and cathode elements, a galvanic connection between each cathode element, a resistance element connected between the cathodes and a point of fixed potential, a connection from the anode element included in the first current path to the control electrode included in the other current path, said connection including a capacity element, a connection between the control electrode included in the first current path and said point of fixed potential, said connection also including a capacity element, a resistance element connected between each of the control electrodes, a load resistance connected to each of the anode elements, terminal means whereat operating voltages are applied through the last-named resistances to the said anode elements, whereby with application of operating potentials a current is first caused to flow between the anode and cathode of the second current path and interruption of current occurs in the first electron path after which the operation is reversed and continues to alternate during the period of application of operating potentials to provide thereby substantially square wave output voltages, and means to vary the resistance element connecting the two said control electrodes whereby the frequency at which the switching operations between the two established current flows is varied.

7. A wave generator comprising thermionic apparatus including means comprising separate pairs of anode, cathode and control electrodes between each of which separately controlled currents are developed with application of operating potentials impressed between the anode and cathode elements, a galvanic connection between each cathode element, a resistance element connected between the cathodes and a point of fixed potential, a connection from the anode element included in the first current path to the control electrode included in the other current path, said connection including a capacity element, a connection between the control electrode included in the first current path and said point of fixed potential, said connection also including a capacity element, a resistance element connected between each of the control electrodes, a load resistance connected to each of the anode elements, terminal means whereat operating voltages are applied through the last-named resistances to the said anode elements, whereby with application of operating potentials a current is first caused to flow between the anode and cathode of the second current path and interruption of current occurs in the first electron path after which the operation is reversed and continues to alternate during the period of application of operating potentials to provide thereby substantially square wave output voltages, means to vary the size of the said capacitors relative to one another to vary the time duration of conductance of current in each current path to vary maximum and minimum portions of the output wave relative to each other, and means for varying the resistance element connecting the two said control electrodes to control the rate at which the switching between each established current flow occurs.

8. A wave generator comprising vacuum tube means including separate pairs of anode, cathode and control electrode elements between which two separately controlled electron flow paths are developed with the application of operating voltages, a common resistor element for connecting each cathode element to a point of fixed potential, a capacity connecting the anode element included within the first of the electron flow paths to the control electrode included in the second of the electron flow paths, a capacity element connecting the control electrode included in the first of the electron flow paths to the said point of fixed potential, a resistive connection between the control electrodes included in each of the electron flow paths, and output terminal connections for deriving from the said combination substantially square wave voltage outputs measured in accordance with the electron flow alternately established between the anode and cathode elements included in each of the electron flow paths during periods of application of operating voltages thereto.

RICHARD C. WEBB.

REFERENCES CITED

The following references are of record in the file of this patent:

UNITED STATES PATENTS

| Number | Name | Date |
|---|---|---|
| 2,356,071 | Macdonald | Aug. 15, 1944 |
| 2,383,822 | Schlesinger | Aug. 28, 1945 |

FOREIGN PATENTS

| Number | Country | Date |
|---|---|---|
| 114,043 | Australia | Oct. 30, 1941 |